March 22, 1949.   R. S. WALKER   2,465,001
LINE REEL
Filed April 11, 1946

INVENTOR.
Russell S. Walker.
BY Geo Stevens
atty.

Patented Mar. 22, 1949

2,465,001

UNITED STATES PATENT OFFICE 2,465,001

LINE REEL

Russell S. Walker, Duluth, Minn.

Application April 11, 1946, Serial No. 661,435

3 Claims. (Cl. 242—96)

This invention relates to reels and has special reference to an improved type of reel especially adapted for use in holding a line such as used in fishing, gardening, hanging out of clothes or the like depending largely upon the size of such reel.

The principal novel characteristics of the instant invention apart from convenience in manufacture are equally advantageous in any size of reel, for example;

The string or line carried by the reel may be wound either over and over the end members longitudinally, around and around the side members, or diagonally from either end member to and over the side member, thence to and around the longitudinally aligned circular corner member and back over the same side to and around the initial circular corner and in any one of the helically formed corners may be drawn to locked engagement as illustrated for suspension of the reel or simply holding the line against unwinding.

In the accompanying drawing forming part of this application,

Figure 1:
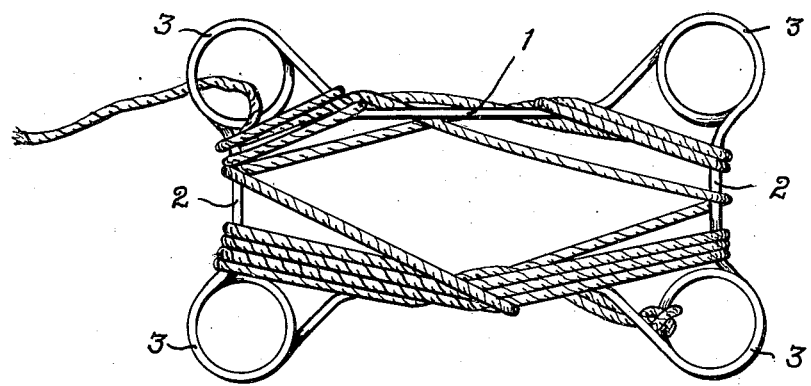
Fig. 1 is a plan view of one of the reels.
Figure 2:
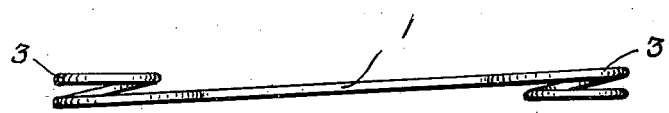
Fig. 2 is a side elevational view of the empty reel.
Figure 3:
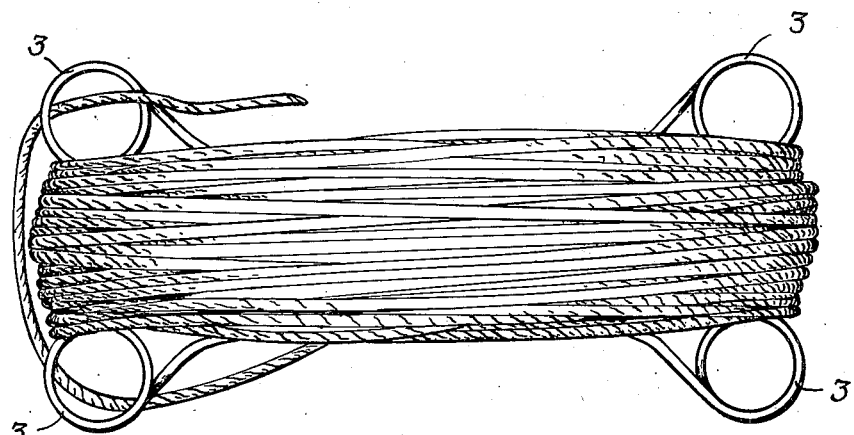
Fig. 3 is a view similar to Fig. 1 showing a different and more pleasing arrangement of winding of the string upon the reel.

The most practical embodiment of the invention contemplates the employment of metal or other suitable wire of proper strength and preferably made with the main straight side members 1—1 and end members 2—2 defining an elongated rectangular figure with four like diagonally extending perfect circular corners 3—3—3—3 each comprising one full circular turn and one-half of the wire to provide a helical protruding member at each of the four corners of the body portion.

The comparatively closely wound helical or spiral effect at each corner results in a most convenient ever-ready clamp into which the line may be drawn for holding against unwinding or for suspension purposes and it is quite apparent that the abnormally large circular corners 3 provide most convenient additional means of suspension.

Another outstanding feature of the reel is the simplicity of making same by first fixing one end of the wire of which the reel is to be formed say midway the approximate contemplated center of one side thereof then passing same one complete turn and one-half about one corner post of a form previously prepared for the making of same, thence around other guiding pegs to and around the next corner post always making the lower-most circle about each post first and leaving the latter at the conclusion of the upper half circle thus resulting in a very simple practically continuous circular motion of the carried wire, then uniting the meeting ends of the wire as by welding, twisting or the like resulting in a quite resilient body portion with very substantial identical circular four corner members resulting in a simple uninterrupted method of manufacture.

The spring tension of the end coils act as keepers for the line at any time.

Having thus described my invention, what I claim and desire to secure by Letters Patent is:

1. A line reel formed of a single piece of wire comprising an elongated rectangular body portion and four like angularly disposed circular corners, each of said corners consisting of at least one turn and one-half of said wire.

2. A line reel formed of a single piece of wire comprising an elongated rectangularly shaped body portion with four spirally formed circular corners.

3. A line reel formed of a single piece of wire comprising a rectangularly shaped body portion with substantially straight sides and having four spirally formed circular corners, said corners being spaced slightly outwardly from the sides of said body portion to form line receiving recesses therebetween.

RUSSELL S. WALKER.

REFERENCES CITED

The following references are of record in the file of this patent:

UNITED STATES PATENTS

| Number | Name | Date |
| --- | --- | --- |
| 1,178,056 | Craig | Apr. 4, 1916 |
| 1,540,244 | Berglund | June 2, 1925 |
| 2,069,695 | Brown | Feb. 2, 1937 |
| 2,222,802 | Ragsdale | Nov. 26, 1940 |